United States Patent [19]

Diamant

[11] Patent Number: 4,517,563
[45] Date of Patent: May 14, 1985

[54] APPARATUS AND METHOD FOR IDENTIFICATION OF OBJECTS

[75] Inventor: Emanuel Diamant, Rosh Pina, Israel

[73] Assignee: Diuk Tsiyud Haliva, Korazin, Israel

[21] Appl. No.: 403,817

[22] Filed: Jul. 30, 1982

[30] Foreign Application Priority Data

Aug. 4, 1981 [IL] Israel .................................... 63502

[51] Int. Cl.$^3$ .............................................. H04Q 9/00
[52] U.S. Cl. .......................... 340/825.54; 340/825.3; 119/51 R
[58] Field of Search ........................ 340/825.54, 825.3; 343/6.5 LC, 6.5 SS; 119/51 R

[56] References Cited

U.S. PATENT DOCUMENTS

| | | |
|---|---|---|
| 3,541,995 | 11/1970 | Fathauer . |
| 3,714,649 | 1/1973 | Brouwer et al. . |
| 3,964,024 | 6/1976 | Hutton et al. . |
| 4,196,418 | 4/1980 | Kip et al. . |
| 4,333,072 | 6/1982 | Beigel ............................ 340/825.54 |
| 4,364,043 | 12/1982 | Cole et al. ...................... 340/825.54 |
| 4,399,437 | 8/1983 | Falck et al. ..................... 340/825.54 |

FOREIGN PATENT DOCUMENTS

56018  11/1978  Israel .

OTHER PUBLICATIONS

Street, M. J. "A Pulse-Code Modulation System for Automatic Animal Identification", *Journal of Agricultural Engineering* Res. 1979, pp. 249–258.

Primary Examiner—Donald J. Yusko
Attorney, Agent, or Firm—Cushman, Darby & Cushman

[57] ABSTRACT

An object identification system comprising an active transponder including a high frequency generator, and a passive transponder including a resonance circuit receiving energy from the active transponder, and a coding circuit powered by the energy received by the resonance circuit. The passive transponder is mounted on an object to be identified.

12 Claims, 2 Drawing Figures

APPARATUS AND METHOD FOR IDENTIFICATION OF OBJECTS

FIELD OF THE INVENTION

The present invention relates to apparatus for sensing the presence of animals generally and more particularly to electrical apparatus for identifying objects.

BACKGROUND OF THE INVENTION

The identification of animals is important in animal husbandry for a number of significant reasons, for example, in modern milking systems where the milk output and sometimes the quality of milk for each individual cow is monitored. In order to associate the production data with the correct cow, there must be provided a technique for entering the identification of the cow to the recording apparatus receiving the data. This may be done conventionally by an operator punching in the identification number appearing on the cow. However, such a procedure is wasteful of the operator's time and subject to errors.

Optical sensing apparatus could also conceivably be used for sensing the presence of a cow in a milking system. Such apparatus would have the disadvantage that it is sensitive to the presence of dirt and dust which can interfere with proper operation thereof.

Other applications for animal sensing apparatus may be in monitoring feeding by animals. Electronic apparatus has been developed for monitoring the entry of an animal's head into a feeding enclosure and employs a transponder employing a resonance circuit. Additional possible applications may be found outside the area of animal husbandry, such as the monitoring of prisoners in a penitentiary.

SUMMARY OF THE INVENTION

The present invention seeks to overcome disadvantages of prior art animal identification techniques and to provide apparatus and a method for identification of animals and other objects which is relatively inexpensive to manufacture and operate and which has a relatively large range.

There is thus provided in accordance with an embodiment of the present invention an object identification system comprising an active transponder including a high frequency generator, and a passive transponder including a resonance circuit receiving energy from the active transponder, and a coding circuit powered by the energy received by the resonance circuit. The passive transponder is mounted on an object to be identified.

According to a preferred embodiment of the present invention the resonance circuits of a plurality of animals and other objects may be the same and have the same frequency. Further in accordance with a preferred embodiment of the present invention, the coding circuit comprises a non-FM modulating circuit, such as a digital switch operated by a shift register, wherein a particular code identifying each animal separately is associated with each shift register.

Further in accordance with a preferred embodiment of the present invention, the active transponder employs a single induction coil for both transmission and reception of signals.

Additionally, techniques for object identification employing the above-described apparatus are provided in accordance with the invention.

BRIEF DESCRIPTION OF THE DRAWINGS

The invention will be more fully understood and appreciated from the following detailed description taken in conjunction with the drawings in which.

DETAILED DESCRIPTION OF THE INVENTION

Figure 1:
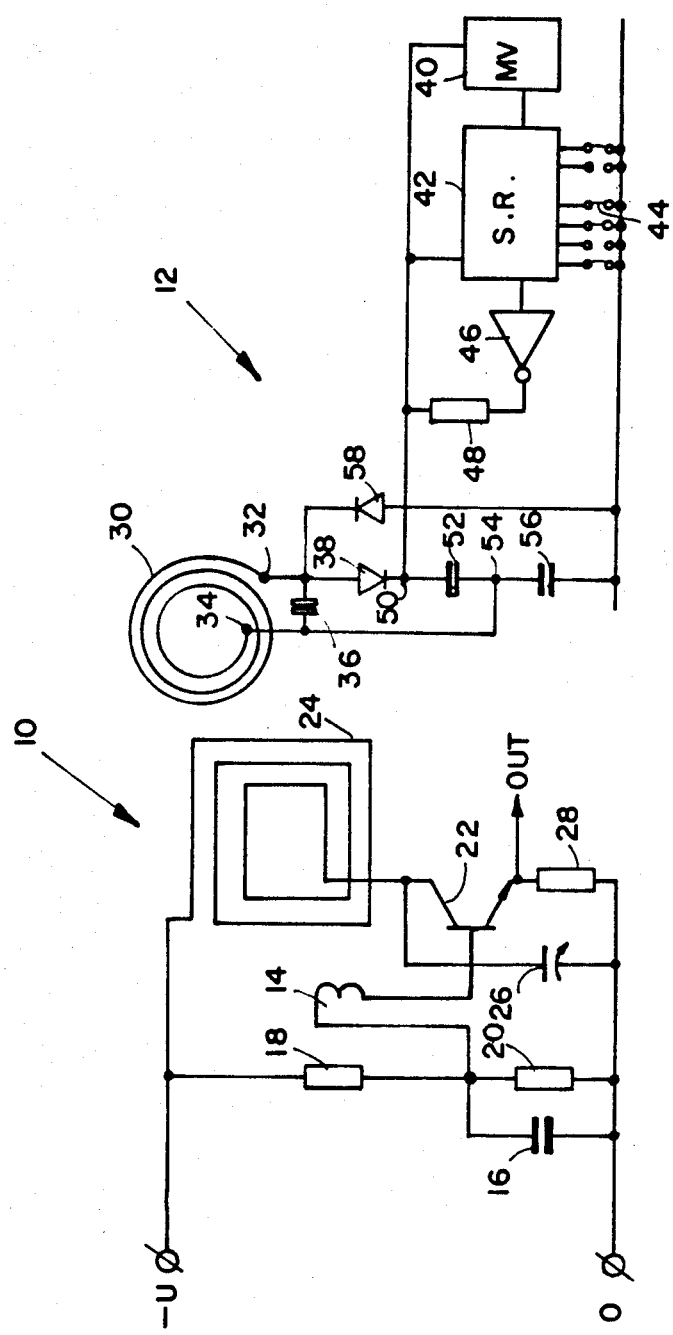
FIG. 1 is an electrical block diagram illustration of an object identification system constructed and operative in accordance with an embodiment of the present invention.

Reference is now made to FIG. 1 which illustrates an object identification system constructed and operative in accordance with an embodiment of the present invention and comprising an active transponder 10 and a passive transponder 12. The active transponder 10 is designed to be located at a fixed location while the passive transponder 12 is designed to be attached onto the animal or other object. The attachment of the passive transponder 12 may be by way of a tag strung around the animal's neck, or alternatively by a tag fixedly attached onto the side, ear or other part of the animal. As a further alternative, the tag may be provided under the skin of the animal.

The active transponder 10 comprises a high frequency generator including an inductor 14 and a capacitor 16 coupled across a voltage divider comprising resistors 18 and 20. The inductor 14 is coupled to the base of a transistor 22. An induction coil 24 is connected between the collector of transistor 22 and a positive voltage source. A variable capacitor 26 is connected between the collector and ground for determining the output frequency of the generator. The emitter of transistor 22 is coupled to ground across a resistor 28 and provides a received signal output.

It is appreciated that the active transponder 10 is operative in both a transmitting and receiving mode. The two modes may operate simultaneously. When transmitting the active transponder provides a high frequency signal typically in the frequency range of 0.1–1.0 MHz, which is transmitted by coil 24. Coil 24 is operative to receive signals of the same frequency having modulation coding.

The passive transponder 12 is characterized in that it contains no power source and operates solely on the energy received from the high frequency transmissions of the active transponder. The passive transponder comprises a coil 30 having first and second terminals 32 and 34 which are coupled across a capacitor 36. Terminal 32 is coupled across a diode 38 providing a ×2 multiplying rectifier. A multivibrator 40 provides an output to a CMOS shift register 42 with which is associated a predetermined code selector 44. The shift register is operated by electrical power received by coil 30 and provides a pre-coded output in response to receipt of the high frequency signal from coil 30, the output being characteristic of a given object and serving to identify same.

The output of shift register 42 is supplied to a CMOS buffer which functions as a switch 46 and provides a modulated output in accordance with the pre-coding of the shift register via a resistor 48 to a junction 50 between diode 38 and a capacitor 52. Terminal 34 is connected at a junction 54 between capacitor 52 and a capacitor 56 which is connected via a diode 58 to terminal 32.

When the switch 46 is open the circuit acts as described above. When the switch is closed, the coil 30 is effectively shortened and it acts as a heavy load to the transmitting coil 24 resulting in reduced amplitude of the transmitted signal. This change is detected at the resistor 28. This construction is a particular feature of the present invention since it enables respective coils 24 and 30 to be employed for both transmission and receiving.

Figure 2:
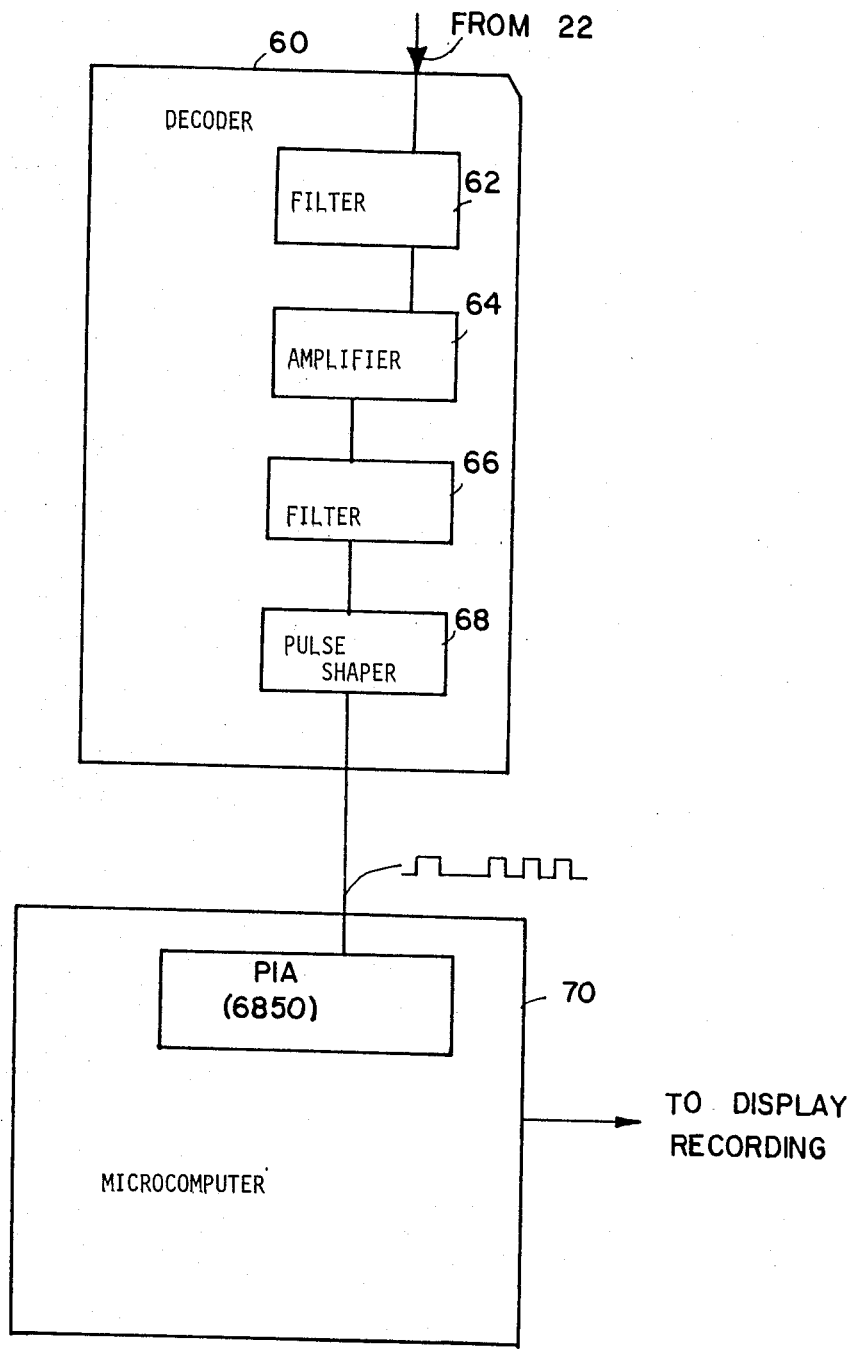
FIG. 2 is an electrical block diagram illustration of signal processing circuitry useful in an embodiment of the present invention.

Referring now to FIG. 2 there is seen signal processing circuitry which receives an output signal from the emitter of transistor 22 in response to a modulated signal produced by the coding of passive transponder 12. This output signal is supplied to a decoder 60 comprising a filter 62, which provides an output to an amplifier 64. The output of amplifier 64 is supplied to a filter 66, whose output is in turn supplied to a pulse shaper 68. The output of a pulse shaper 68 is supplied to a main microcomputer 70 which is operative to decode the coded signal and provide a suitable identifying output to display and/or recording apparatus.

Typical component values for the illustrated embodiment of the invention are as follows:

| Inductor | 14 $\omega=6$ $\phi300$ mn | Transmission Coil | 30 | $\omega=7$ $\phi=80$ |
| --- | --- | --- | --- | --- |
| Capacitor | 16 0.01 | | | |
| Resistor | 18 56k | Capacitor | 36 | 39 pf |
| Resistor | 20 7.5k | Diode | 38 | IN3605 |
| Transistor | 22 2N2222 | Multivibrator | 40 | 4007 |
| Induction Coil | 24 $\omega=1$ | Shift Register | 42 | SCD 4030 |
| | | CMOS Buffer | 46 | SCD 4007 |
| Variable Capacitor | 26 6÷30 pf | Resistor | 48 | 510 $\Omega$ |
| | | Capacitor | 52 | 6.8 $\mu f$ |
| Resistor | 28 1.2k | Capacitor | 56 | 6.8 $\mu f$ |
| | | Amplifier | 64 | |
| | | Filter | 66 | LM 311 |
| | | Pulse Shaper | 68 | |
| | | Microcomputer | 70 | MEC 6800D2 |

It will be appreciated by persons skilled in the art that the invention is not limited to what has been particularly shown and described hereinabove. Rather the scope of the present invention is defined only by the claims which follow:

I claim:

1. An object identification system comprising:
   an active transponder including a signal generator comprising a transmitting coil and an inductor and means for detecting resonance circuit load modulation;
   a passive transponder mounted on an object and including a resonance circuit receiving energy transmitted by the active transponder;
   a coding circuit, associated with the passive transponder, powered by an electrical signal received from said resonance circuit for selectably modulating said electrical signal, thereby modulating the load on said resonance circuit.

2. An object identication system according to claim 1 and wherein said signal generator comprises a high frequency generator.

3. An identification system according to claim 1 and wherein said coding circuit is operative to modulate the electrical signal in accordance with a predetermined code.

4. An identification system according to claim 1 and wherein said selectably modulated electrical signal in said passive transponder is at substantially the same frequency as the transmitted signal.

5. An identification system according to claim 1 and comprising a plurality of passive transponders, each associated with an object to be separately identified, each passive transponder comprising an identical resonance circuit having a different code, the selectably modulated electrical signal of each being at the same frequency.

6. An identification system according to claim 1 and wherein said coding circuit comprises a non-FM modulating circuit.

7. An identification system according to claim 1 and wherein said coding circuit comprises a digital switch operated by a shift register.

8. An identification system according to claim 1 and wherein said object is an animal.

9. An identification system according to claim 1 and wherein said signal generator comprises a high frequency generator;
   and comprising a plurality of passive transponders, each associated with an object to be separately identified, each transponder comprising an identical resonance circuit and comprising a coding circuit operative to modulate the electrical signal in accordance with a different predetermined code.

10. An identification system according to claim 9 and wherein said selectably modulated electrical signals in said pasive transponders are at substantially the same frequency as the transmitted signal.

11. An identification system according to claim 9 and wherein each said coding circuit comprises a digital switch operated by a shift register.

12. An identification system according to claim 9 and wherein said coding circuits comprise non-FM modulating circuits.

* * * * *